(12) United States Patent
Achtermann et al.

(10) Patent No.: US 7,895,069 B2
(45) Date of Patent: Feb. 22, 2011

(54) SYSTEM AND METHOD FOR IMPLEMENTING DATABASE CONCURRENCY FOR ALLOWING MULTIPLE AGENTS TO COORDINATE EXECUTION OF TASKS IN A CLUSTER

(75) Inventors: Jeffrey M. Achtermann, Austin, TX (US); Steven A. Jarvis, Austin, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 11/558,310

(22) Filed: Nov. 9, 2006

(65) Prior Publication Data

US 2008/0114637 A1    May 15, 2008

(51) Int. Cl.
  *G06F 17/60* (2006.01)
(52) U.S. Cl. .......................................................... 705/8
(58) Field of Classification Search ...................... 705/8
  See application file for complete search history.

(56) References Cited

U.S. PATENT DOCUMENTS

| | | | |
|---|---|---|---|
| 6,718,330 B1 * | 4/2004 | Zenner | 1/1 |
| 6,772,177 B2 | 8/2004 | Hsiao et al. | |
| 7,035,808 B1 * | 4/2006 | Ford | 705/7 |
| 7,110,525 B1 * | 9/2006 | Heller et al. | 379/265.11 |
| 7,689,447 B1 * | 3/2010 | Aboujaoude et al. | 705/7 |
| 2002/0184244 A1 | 12/2002 | Hsiao et al. | |

* cited by examiner

*Primary Examiner*—Romain Jeanty
(74) *Attorney, Agent, or Firm*—Dillon & Yudell LLP

(57) ABSTRACT

A system, computer-implementable method, and computer-readable medium for processing a collection of work items in a data processing system. According to a preferred embodiment of the present invention, an agent monitor assembles a work items list that includes a collection of work items, wherein at least one work item among the collection of work items is a work item that is unassigned to at least one agent among a collection of agents. The agent monitor assigns the at least one work item to the at least one agent. In response to determining that the at least one agent has entered into a hang state, the agent monitor releases the at least one work item from the at least one agent.

10 Claims, 4 Drawing Sheets

SYSTEM AND METHOD FOR IMPLEMENTING DATABASE CONCURRENCY FOR ALLOWING MULTIPLE AGENTS TO COORDINATE EXECUTION OF TASKS IN A CLUSTER

BACKGROUND OF THE INVENTION

1. Technical Field

The present invention relates in general to the field of data processing systems. More specifically, the present invention relates to a system and method for implementing database concurrency for allowing multiple agents to coordinate execution of tasks in a cluster.

2. Description of the Related Art

As well-known in the prior art, modern computer systems can be organized into clusters of individual computers via a network. Such computer clusters run a variety of computer applications, from providing a service to clients to processing database entries. However, within a computer cluster, there is a need for the coordination of the execution of work items among several agents running on a computer cluster. Therefore, there is a need for a system of method for addressing the aforementioned limitations of the prior art.

SUMMARY OF THE INVENTION

The present invention includes a system, computer-implementable method, and computer-readable medium for processing a collection of work items in a data processing system. According to a preferred embodiment of the present invention, an agent monitor assembles a work items list that includes a collection of work items, wherein at least one work item among the collection of work items is a work item that is unassigned to at least one agent among a collection of agents. The agent monitor assigns the at least one work item to the at least one agent. In response to determining that the at least one agent has entered into a hang state, the agent monitor releases the at least one work item from the at least one agent.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1A:
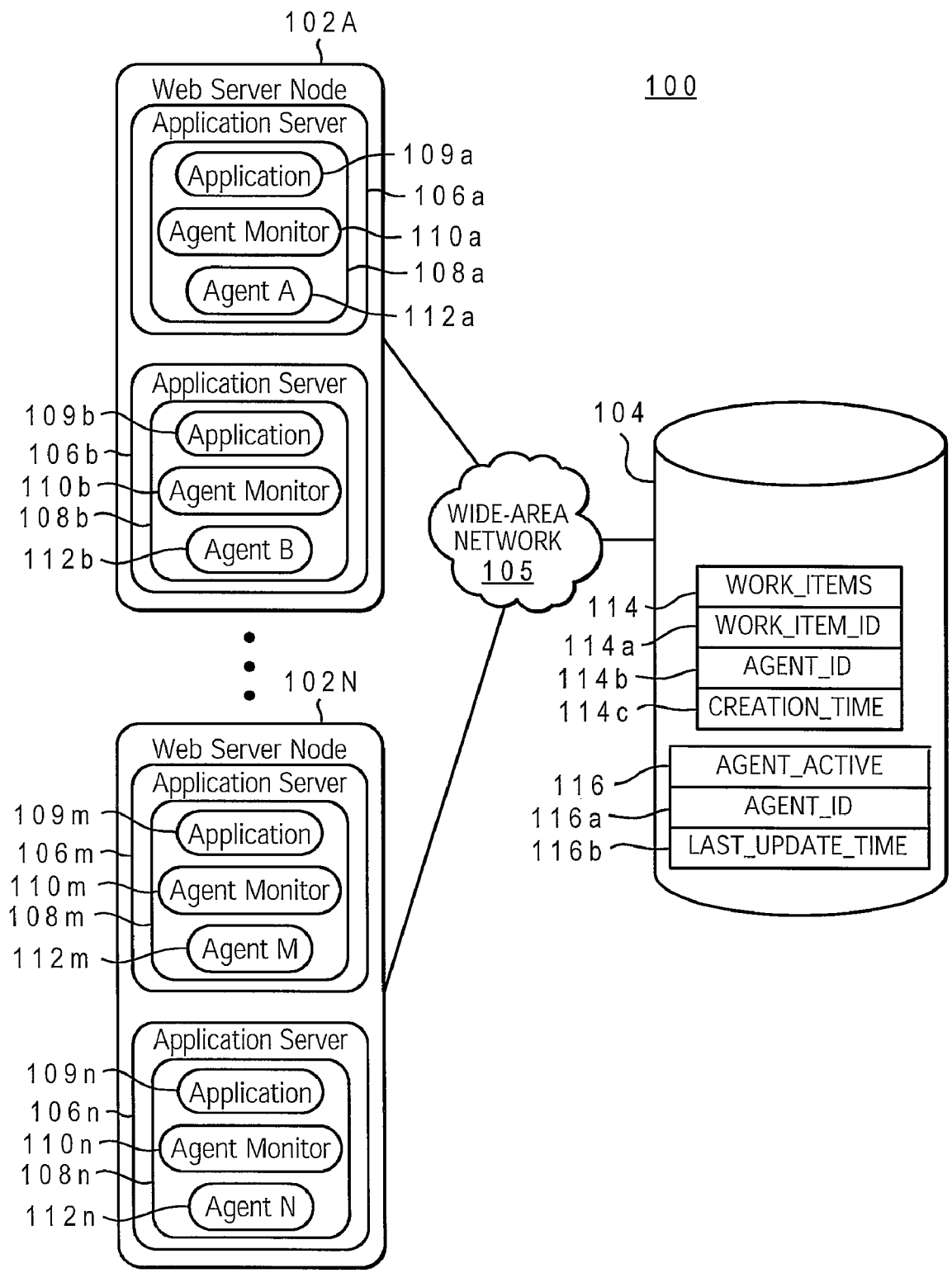
FIG. 1A is a block diagram illustrating an exemplary network in which a preferred embodiment of the present invention may be implemented.

Referring now to the figures, and in particular, referring to FIG. 1, there is illustrated a block diagram depicting an exemplary network 100 in which a preferred embodiment of the present invention may be implemented. As depicted, exemplary network 100 includes a collection of web server nodes 102a-n coupled to a database server 104 via wide-area network (WAN) 103. Those with skill in the art will appreciate that WAN 103 may also include local area networks (LANs), the Internet, wired or wireless network, etc.

Web server nodes 102a-102n includes multiple application servers 106a-106n that manipulate files within database server 104. Each application server 106a-106n includes system memory 108a-108n, which further includes applications 109a-109n, agent monitors 108a-108n, and agents 112a-112n. As depicted, database server 104 includes work items list 114 and agent active list 116.

Each entry in work items list 114 includes three fields: a work item id field 114a, an agent ID field 114b, and a creation time field 114c. Agent active list 116 includes an agent ID field 116a and a last update time field 116b. Both lists and their respective fields will be discussed herein in more detail in conjunction with FIGS. 2A-2B.

Figure 1B:
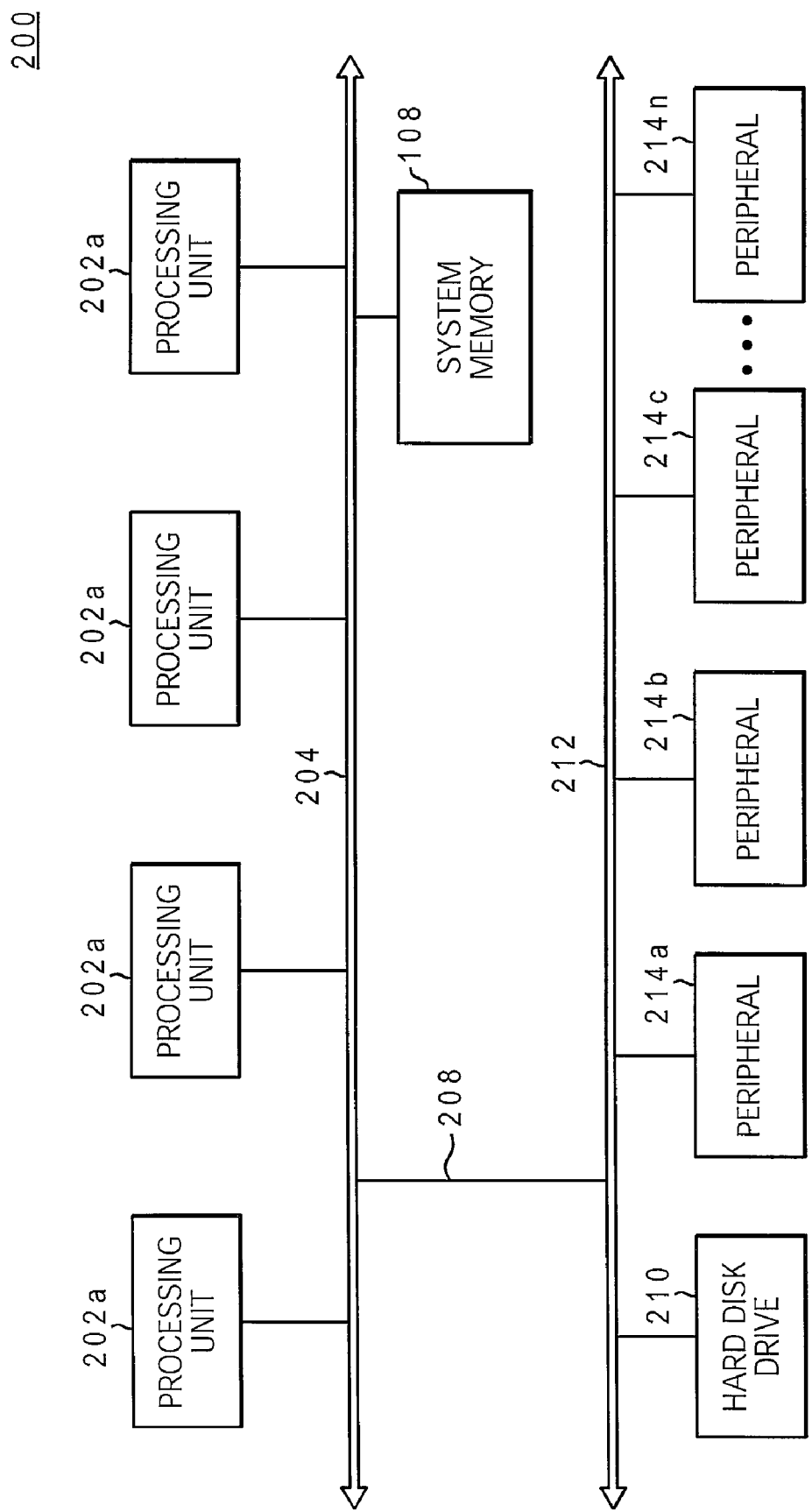
FIG. 1B is a block diagram depicting an exemplary data processing system in which a preferred embodiment of the present invention may be implemented.

With reference to FIG. 1B, there is depicted an exemplary data processing system 100, which may be utilized to implement application servers 106a-106n and database server 104 of network 100 as shown in FIG. 1A. As illustrated, data processing system 200 includes a collections of processing units 202a-n, which are coupled to system memory 106 via a system interconnect 204. System interconnect 204 is coupled to peripheral interconnect 212 via mezzanine interconnect 208. Those with skill in the art will appreciate that peripheral interconnect 212 may be implemented by any type of interconnect including, but not limited to: peripheral component interconnect (PCI) bus, advanced graphics port (AGP), small computer system interface (SCSI), etc. Coupled to peripheral interconnect 212 is a hard disk drive 210 for mass storage and a collection of peripherals 214a-214n, which may include, but are not limited to: optical drives, other hard disk drives, printers, input devices, etc.

Those with skill in the art will appreciate that data processing system 200 can include many additional components not specifically illustrated in FIG. 1B. Because such additional components are not necessary for an understanding of the present invention, they are not illustrated in FIG. 1B or discussed further herein. It should be understood, however, that the enhancements to data processing system 200 for database concurrency for allowing multiple agents to coordinate execution of tasks in a cluster provided by the present invention are applicable to data processing systems of any system architecture and are in no way limited to the generalized multi-processor architecture or symmetric multi-processing (SMP) architecture illustrated in FIG. 1B.

Figure 2A:
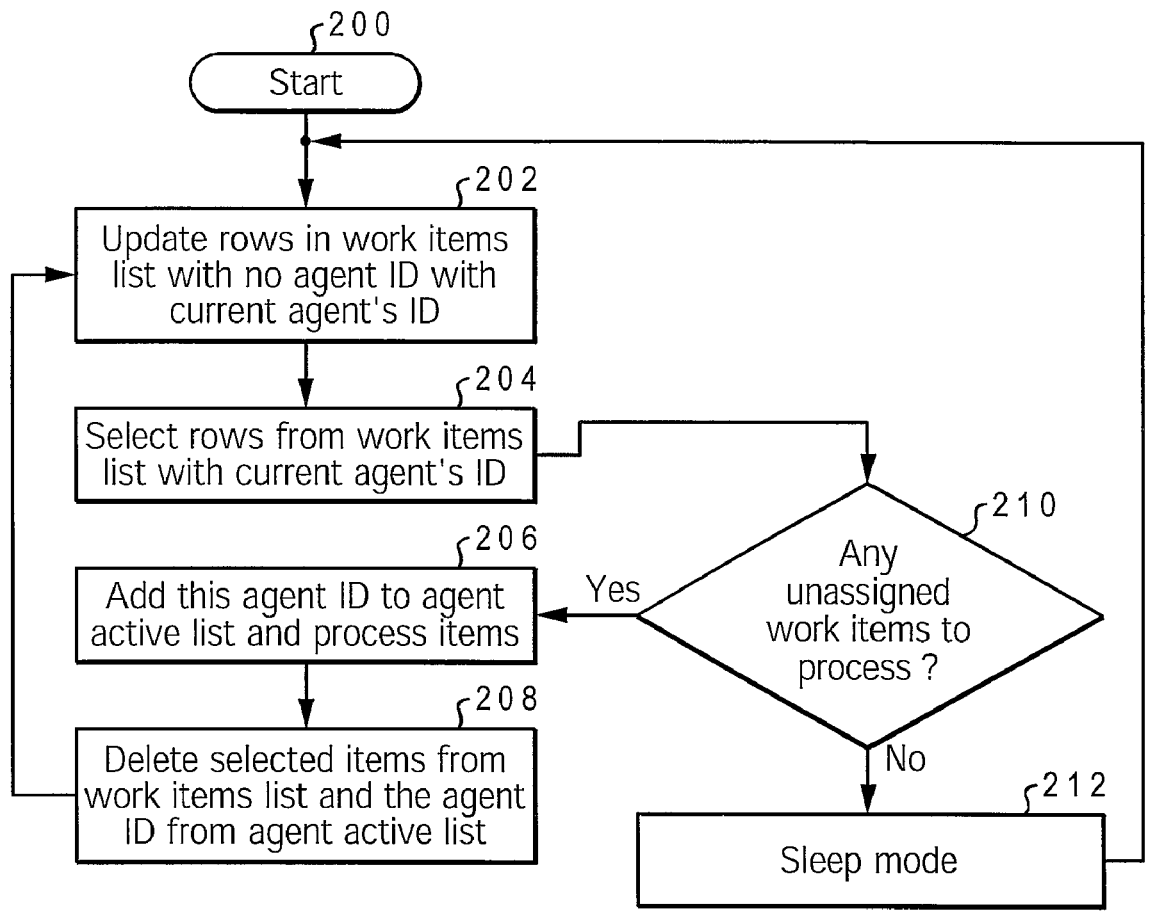
FIG. 2A is a high-level logical flowchart illustrating the operation of an agent according to a preferred embodiment of the present invention.

FIG. 2A is a high-level logical flowchart illustrating exemplary operating of an agent (e.g., agent 112a) according to a preferred embodiment of the present invention. The process begins at step 200 and continues to step 202, which illustrates the agent updating rows in work items list 114 that do not include an agent ID with the current agent's ID in Agent ID field 114b. These rows represent unprocessed work items that are waiting for agent assignments. Once the unprocessed are assigned, to agents, the process continues to step 204, which illustrates the agent selecting rows within work items list 114 that include the current agent ID within Agent ID field 114b. The agent identifies work items that are assigned to that particular agent and selects these work items for processing.

The process continues to step 210, which illustrates the agent determining if there are any other unassigned work items in work items list 114 to process. If there are no other unassigned work items to process, the process continues to step 212, which illustrates the agent entering into a sleep mode for a predetermined period of time. The process returns to step 202 and proceeds in an iterative fashion.

If, however, the agent determines that there are unassigned work items to process, the process continues to step 206, which depicts the agent adding or updating the agent ID field 116a to agent active list 116 with the last update time field 116b to indicate the last time the agent started a work item. Agent monitor 110 periodically checks these values to ensure that no values are hung. If so, the agent monitor sends the agent ID to null in work items list 114 for all work items with that agent ID and removes the agent ID from agent active list 116. Also, the agent begins processing the selected work items, as illustrated in step 206.

After the assigned work items are processed, the process continues to step 208, which shows the agent deleting the selected (and completed) work items from work items list 114 and the agent ID from agent active list 116. The process returns to step 202, and continues in an iterative fashion.

Figure 2B:
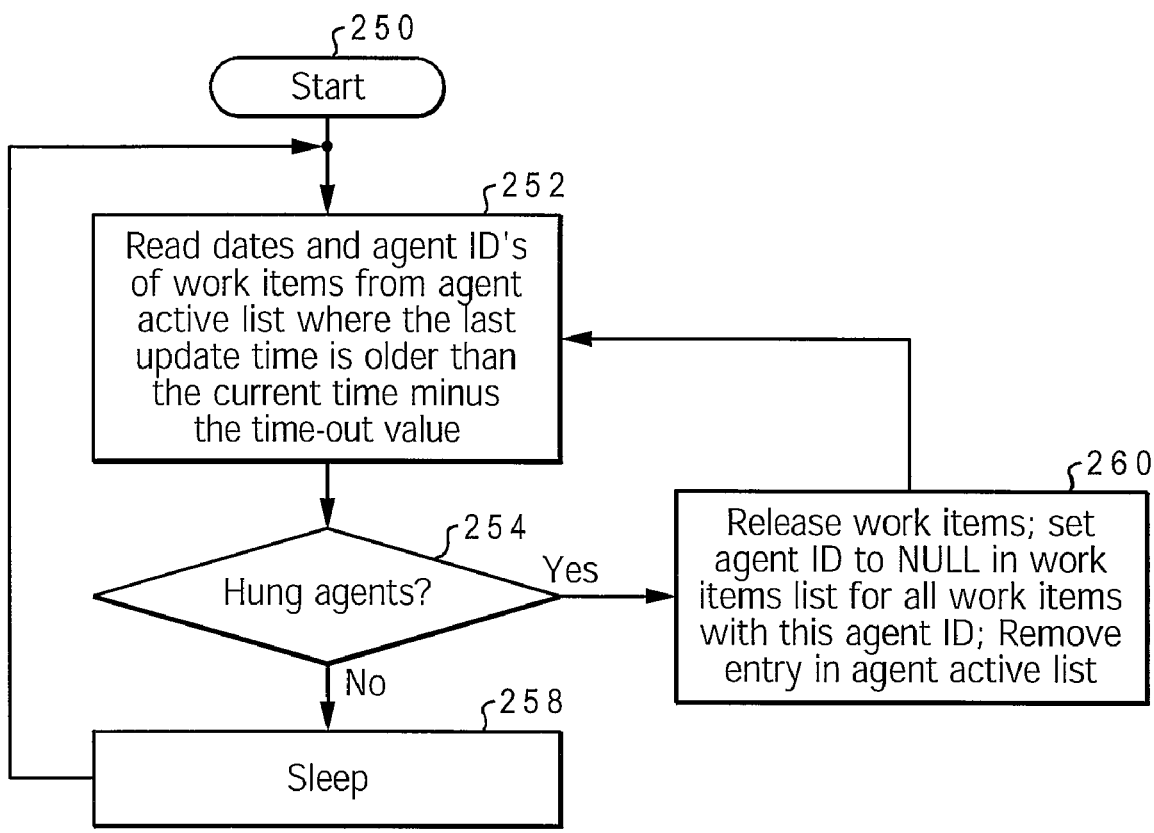
FIG. 2B is a high-level logical flowchart depicting the operation of an agent monitor according to a preferred embodiment of the present invention.

FIG. 2B is a high-level logical flowchart depicting exemplary operation of an agent monitor (e.g., agent monitor 110a-110n) according to a preferred embodiment of the present invention. The process begins at step 250, and proceeds to step 252, which illustrates the agent monitor reading the dates and agent IDs of work items from agent active list 116 where the last update time is older than the current time minus a time-out value. The process moves to step 254, which illustrates the agent monitor determining if the any agents have entered into a hang state. According to an embodiment of the present invention, an agent periodically updates the last update time field 116b corresponding to its entry in agent active list 116. If the last update time value is greater than the current time minus a time-out value, the corresponding agent is considered a "hung agent".

If the agent monitor determines that there are no hung agents, the process continues to step 258, which illustrates the agent monitor entering into a sleep state for a predetermined period of time. The process then returns to step 252 and proceeds in an iterative fashion.

If, however, the agent monitor determines that there is at least one hung agent, the process continues to step 260, which depicts the agent monitor releasing all work items currently assigned to the hung agents. The agent monitor also sets the agent IDs for all hung agents to "NULL" in the work items list for all work items with an agent ID of a hung agent. Also, the agent monitor removes the entry corresponding to the hung agent from agent active list 116. The process returns to step 252 and proceeds in an iterative fashion.

As discussed, the present invention includes a system, computer-implementable method, and computer-readable medium for processing a collection of work items in a data processing system. According to a preferred embodiment of the present invention, an agent monitor assembles a work items list that includes a collection of work items, wherein at least one work item among the collection of work items is a work item that is unassigned to at least one agent among a collection of agents. The agent monitor assigns the at least one work item to the at least one agent. In response to determining that the at least one agent has entered into a hang state, the agent monitor releases the at least one work item from the at least one agent.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writeable storage media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A system for processing a plurality of work items shared by a plurality of data processing systems, said system comprising:
a processor;
a system memory coupled to said processor; and
a computer-usable medium embodying computer program product, wherein said computer-usable medium includes computer program code for:
connecting said system to a database server via a wide-area network, wherein said database server is also connected said plurality of data processing systems via said wide-area network, wherein said database server includes a work items list and an agent active list, wherein said work items list contains a plurality of work items corresponding to a respective agent, wherein said agent active list contains a last update time value for each agent;
determining whether or not there is a hung agent in said agent active list, wherein an agent is considered as a hung agent when a last update time value of said agent is greater than the current time value minus a predetermined time-out value; and
in response to a determination that there is a hung agent in said agent active list releasing any associated work item from said hung agent, and removing said hung agent from said agent active list.

2. The system according to of claim 1, wherein said computer-usable medium further includes computer program code for, in response to a determination that there is no hung agent in said agent active list, entering a sleep mode.

3. The system of claim 1, wherein said computer program code for removing further includes computer program code for removing said hung agent from said agent active list to said work items list.

4. The system of claim 1, wherein each item in said agent active list includes an agent ID field and a last update time field.

5. The system of claim 1, wherein each item in said work items list includes an agent ID field, a work item ID field, and a creation time field.

6. A computer-usable medium embodying computer program product processing a plurality of work items shared by a plurality of data processing systems, said computer-usable medium comprising:
   computer program code for connecting a computer system to a database server via a wide-area network, wherein said database server is also connected said plurality of data processing systems via said wide-area network, wherein said database server includes a work items list and an agent active list, wherein said work items list contains a plurality of work items corresponding to a respective agent, wherein said agent active list contains a last update time value for each agent;
   computer program code for determining whether or not there is a hung agent in said agent active list, wherein an agent is considered as a hung agent when a last update time value of said agent is greater than the current time value minus a predetermined time-out value; and
   computer program code for, in response to a determination that there is a hung agent in said agent active list, releasing any associated work item from said hung agent, and removing said hung agent from said agent active list.

7. The computer-usable medium of claim 6, wherein said computer-usable medium further includes computer program code for, in response to a determination that there is no hung agent in said agent active list, entering a sleep mode.

8. The computer-usable medium of claim 6, wherein said computer program code for removing further includes computer program code for removing said hung agent from said agent active list to said work item list.

9. The computer-usable medium of claim 6, wherein each item in said agent active list includes an agent ID field and a last update time field.

10. The computer-usable medium of claim 6, wherein each item in said work items list includes an agent ID field, a work item ID field, and a creation time field.

* * * * *